United States Patent [19]
Pease et al.

[11] 4,206,461
[45] Jun. 3, 1980

[54] RADAR SYSTEM WITH IMPROVED VISUAL DETECTION OF LONG RANGE TARGETS

[75] Inventors: William M. Pease, Weston; Albert A. Pope, Woburn, both of Mass.

[73] Assignee: Raytheon Company, Lexington, Mass.

[21] Appl. No.: 12,975

[22] Filed: Feb. 21, 1979

[51] Int. Cl.² .............................................. G01S 9/02
[52] U.S. Cl. ................................ 343/5 DP; 315/378; 315/383; 343/5 R; 343/17
[58] Field of Search ............ 315/378, 383; 343/5 SM, 343/5 R, 5 DP, 17

[56] References Cited

U.S. PATENT DOCUMENTS

| | | | |
|---|---|---|---|
| 2,472,209 | 6/1949 | Hall | 343/5 R |
| 3,423,627 | 1/1969 | Hansen et al. | 315/383 |
| 3,502,937 | 3/1970 | Bader et al. | 315/383 |
| 4,068,233 | 1/1978 | Pease et al. | 343/5 DP |
| 4,086,579 | 4/1978 | Easter | 315/383 |
| 4,107,673 | 8/1978 | Gross et al. | 343/5 DP |

*Primary Examiner*—S. C. Buczinski
*Attorney, Agent, or Firm*—Joseph D. Pannone; Milton D. Bartlett; Herbert W. Arnold

[57] ABSTRACT

A radar system in which the time duration of video pulses corresponding to echo returns is increased as a direct function of the range of the return. On a PPI visual indicator, the visibility of long range targets is thus enhanced by increased size without distorting the display of short range targets and clutter.

24 Claims, 13 Drawing Figures

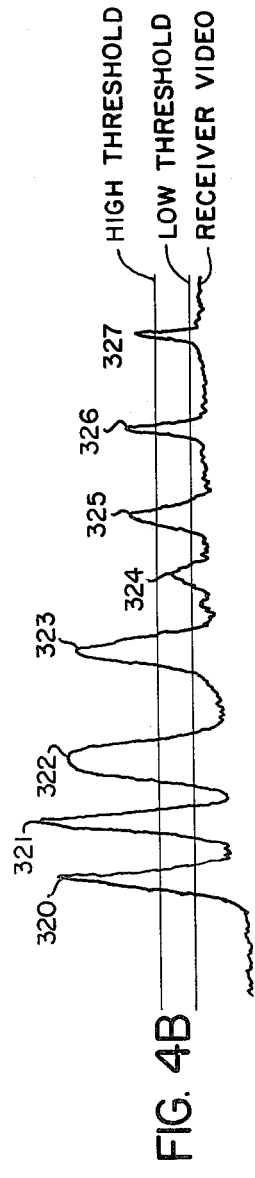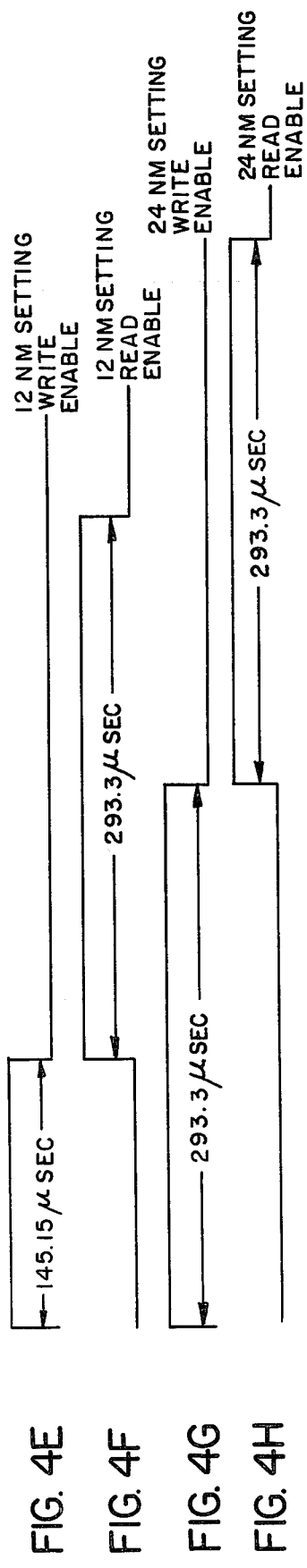
FIG. 4A — RADAR TRIGGER
FIG. 4B — HIGH THRESHOLD / LOW THRESHOLD / RECEIVER VIDEO
FIG. 4C — LO LEVEL VIDEO
FIG. 4D — HI LEVEL VIDEO
FIG. 4E — 12 NM SETTING WRITE ENABLE
FIG. 4F — 12 NM SETTING READ ENABLE
FIG. 4G — 24 NM SETTING WRITE ENABLE
FIG. 4H — 24 NM SETTING READ ENABLE

RADAR SYSTEM WITH IMPROVED VISUAL DETECTION OF LONG RANGE TARGETS

BACKGROUND OF THE INVENTION

In previous shipboard radar systems, targets at long range have been difficult to detect visually on plan position indicator (PPI) displays. For a given range scale setting, the echoes from targets at long range are much weaker than those at short range. Accordingly, without any processing compensation, the video signals transferred to the PPI display for long range targets do not produce sufficient electron beam energy to illuminate the phosphor so as to compare with the intensity of short range targets. Furthermore, if the PPI display is presented with a display signal having discrete levels resulting from threshold detection, identical targets at different ranges will be displayed for different time durations because the longer range echoes are weaker and remain above the threshold for a shorter period of time. The long range targets appear only as thin arcs and are thus difficult to detect visually.

Sensitivity time control (STC) has been used in the prior art to reduce the receiver gain for short ranges so that target echoes can be detected in the presence of strong sea clutter. Although the primary purpose of STC has been to correct for the effect of strong sea clutter illuminating the entire region near the center of a PPI display, it has also been useful in compensating for echos at different ranges having different amplitudes. However, because of the limited dynamic range of receivers, STC is not an effective way of compensating for echoes of varying amplitudes at long ranges.

In prior art Marine radars, the transmitted pulse widths have been increased for the long range settings. Even though these longer pulses sacrifice the greater definition for shorter range targets, they may be required to obtain acceptable signal-to-noise ratios for long range targets. Although longer transmitted pulse widths substantially improve the PPI display for long range targets, they are not an effective solution to improving the overall display because they equally increase the display duration of short range targets.

Another method of improving the visual display of long range targets is described in U.S. Pat. No. 2,472,209, wherein the pulses of the display signal are increased in time duration to increase the detectability of long range targets. This solution to the visual display of long range targets, however, distorts the visual display of short range targets which prior to processing possessed sufficient intensity for proper display.

SUMMARY OF THE INVENTION

In accordance with the present invention, a radar system comprises means for converting a radar echo signal into a voltage waveform having a plurality of discrete voltage levels, said converting means being coupled to a means for increasing the time duration of one level as a direct function of range, and means for providing a visual indication of the output of said increasing means. The increasing means may preferably increase the time duration of the one level at its output by loading a counter with data related to range at the commencement of the level and then counting until a carry-out pulse terminates the maintaining of the one level. The visual indication means preferably comprises a cathode ray tube display operating in a PPI mode.

It may be preferable that the radar system comprises means for storing digital representations of the voltage waveform in a first time period and then reading the representations out during a second time period which for at least some settings of a radar range scale setting is greater than the first time period.

It may also be preferable that the radar system further comprises means for eliminating interference in the voltage waveform before coupling to the increasing means. Preferably, the means for eliminating interference comprises means for storing digitized representations of the waveform, comparing corresponding range representations from two consecutive transmitted pulses, and providing an active signal representation only when both compared representations are active.

It may also be preferable that the converting means convert an echo waveform into two signals representing at least two different amplitude levels of said echo waveform and that the increasing means be initiated by the signal representing the lower amplitude level of the echo waveform.

BRIEF DESCRIPTION OF THE DRAWINGS

The foregoing and other objects and advantages of the invention will be understood more fully in the following detailed description thereof with reference to the accompanying drawings wherein:

FIGS. 4A-H are a series of waveforms illustrative of processing radar signals and timing thereof in accordance with the teachings of the present invention.

DESCRIPTION OF THE PREFERRED EMBODIMENT

Figure 1:
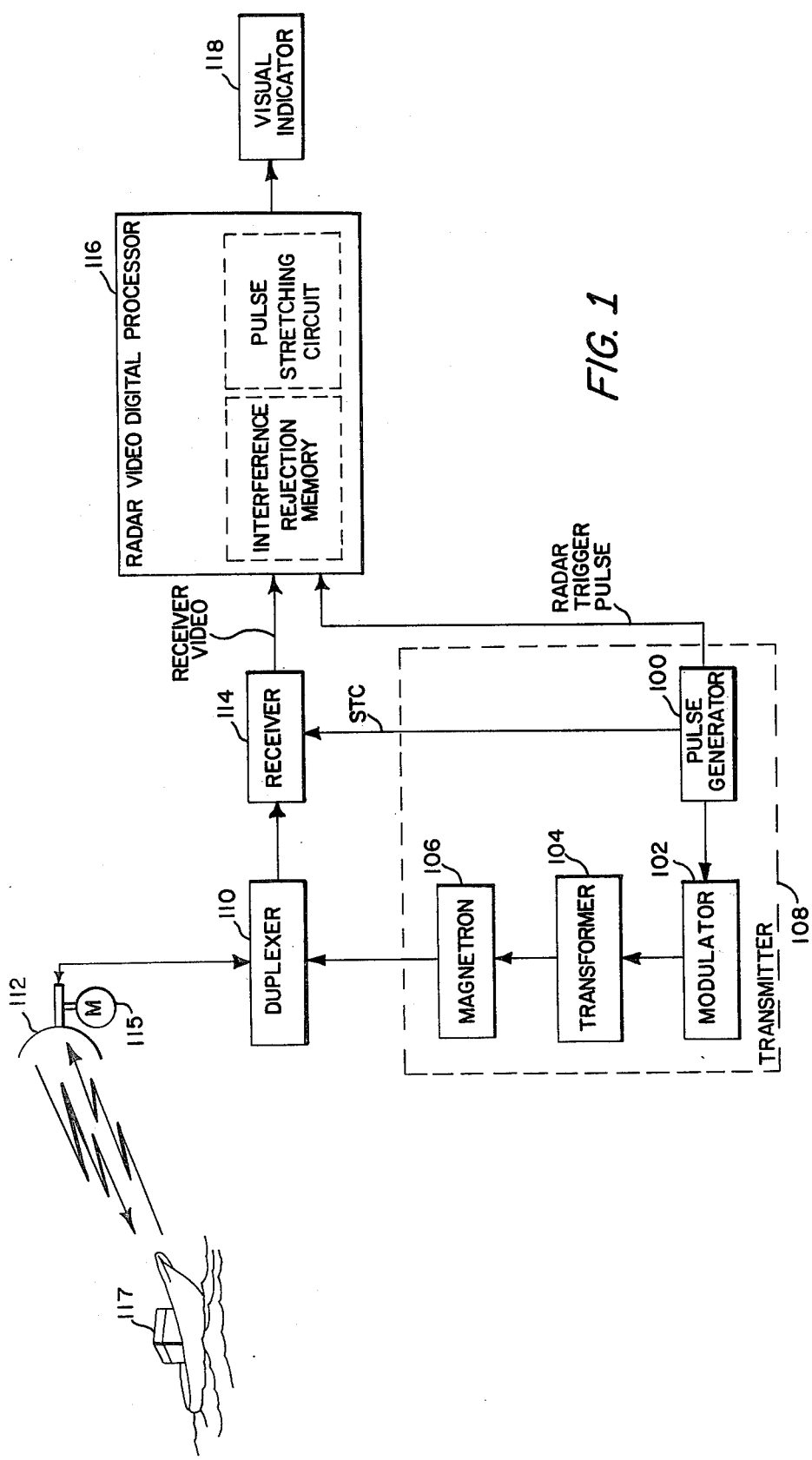
FIG. 1 is a block diagram of a radar system in which the present invention is used to advantage.

Referring first to FIG. 1, there is shown a basic block diagram of a marine PPI radar system constructed in accordance with the teachings of the present invention. The transmission of a radar pulse is initiated by pulse generator 100 which simultaneously couples the radar trigger pulse to modulator 102 and radar video digital processor 116. The modulator generates the waveform to be transmitted and couples it through transformer 104 to magnetron 106 where it is preferably converted to pulsed microwave power. The pulse generator, modulator, transformer and magnetron comprise the transmitter 108. The duplexer 110 operates by coupling the microwave power from the transmitter to the antenna 112 during one portion of the radar pulse period, and then coupling the radar return echoes from the antenna to the receiver 114 during the remainder of the radar pulse period. Typically, the antenna is mounted on the ship's mast (not shown) where radar pulses can be radiated clear of any on-board obstruction. Also, it is typical to use a motor 115 to rotate the antenna.

When a transmitted pulse strikes an object such as, for example, a distant ship 117, a return echo is reflected back to the antenna 112 where it is coupled through the duplexer to the receiver 114. The lapsed time from transmission to reception is proportional to the distance traveled. Accordingly, the input to the receiver for one transmitted pulse can be characterized as a train of echoes or pulses from objects at different distances. Generally, the echoes can be categorized into targets which are of interest and clutter which is not. The receiver amplifies the return pulses and converts them to an IF and then to a video signal which is coupled to a radar video digital processor 116 which is described in detail with reference to FIG. 2A and 2B. Briefly, however, the receiver output is threshold detected at two discrete signal levels and then consecutively sampled, each sample being related to a particular range. Signal-to-noise discrimination is provided by presenting active signal indications only when two or more out of four consecutive samples indicate detection. The output of the sliding window preprocessor is sampled and held. These samples are combined into digital words which are stored in a memory for readout in nonreal time. Each bit of each address corresponds to a range cell. The digital words later read out of memory are converted into two continuous pulse streams. After providing interference rejection, the time duration of pulses is increased as a direct function of range. The resulting output is then coupled to a visual indicator 118 where it is displayed in a PPI mode.

Figure 2A:
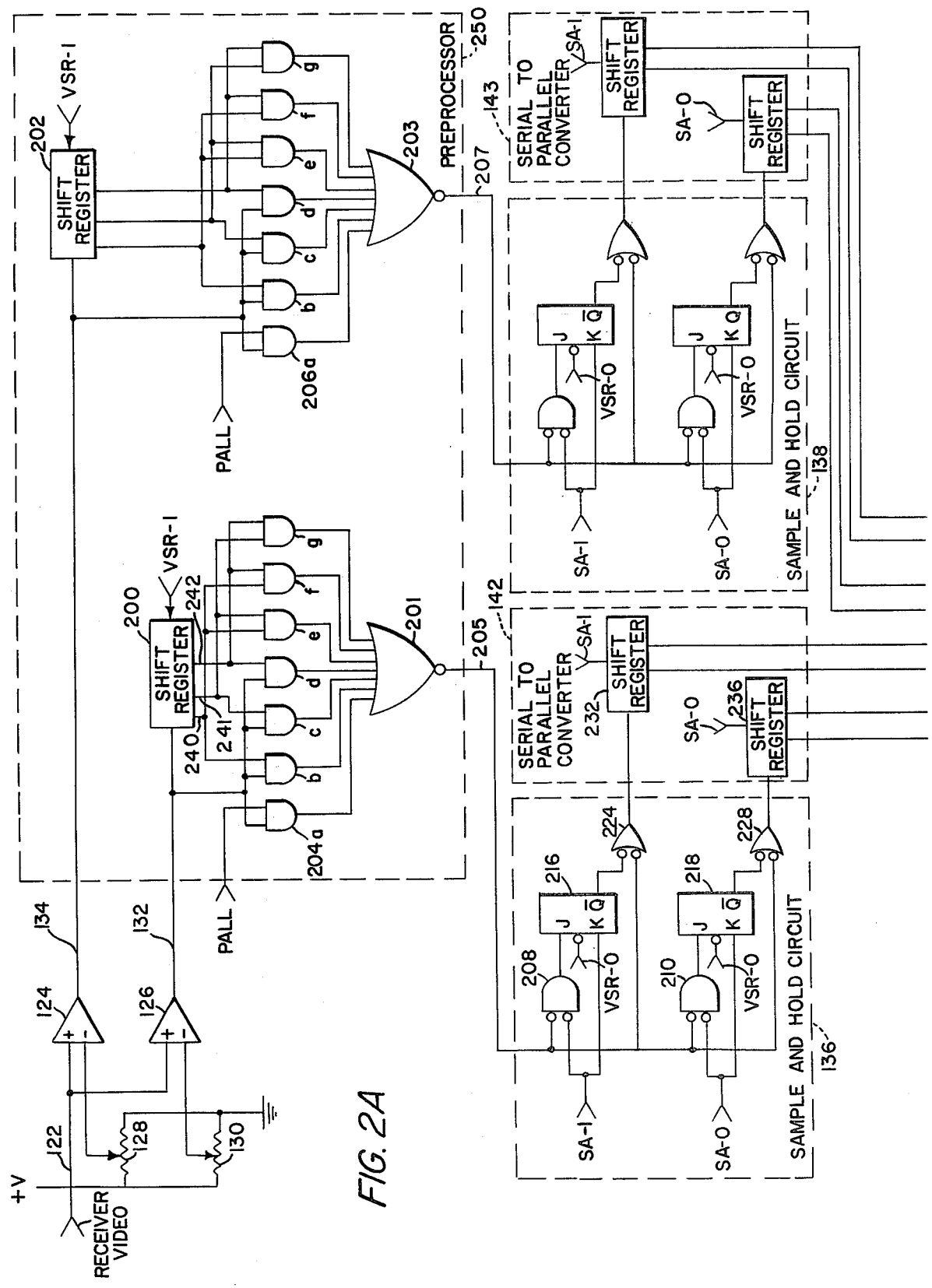
FIGS. 2A and 2B are schematic/functional diagrams of the radar video digital processor of the radar system using the present invention.
Figure 2B:
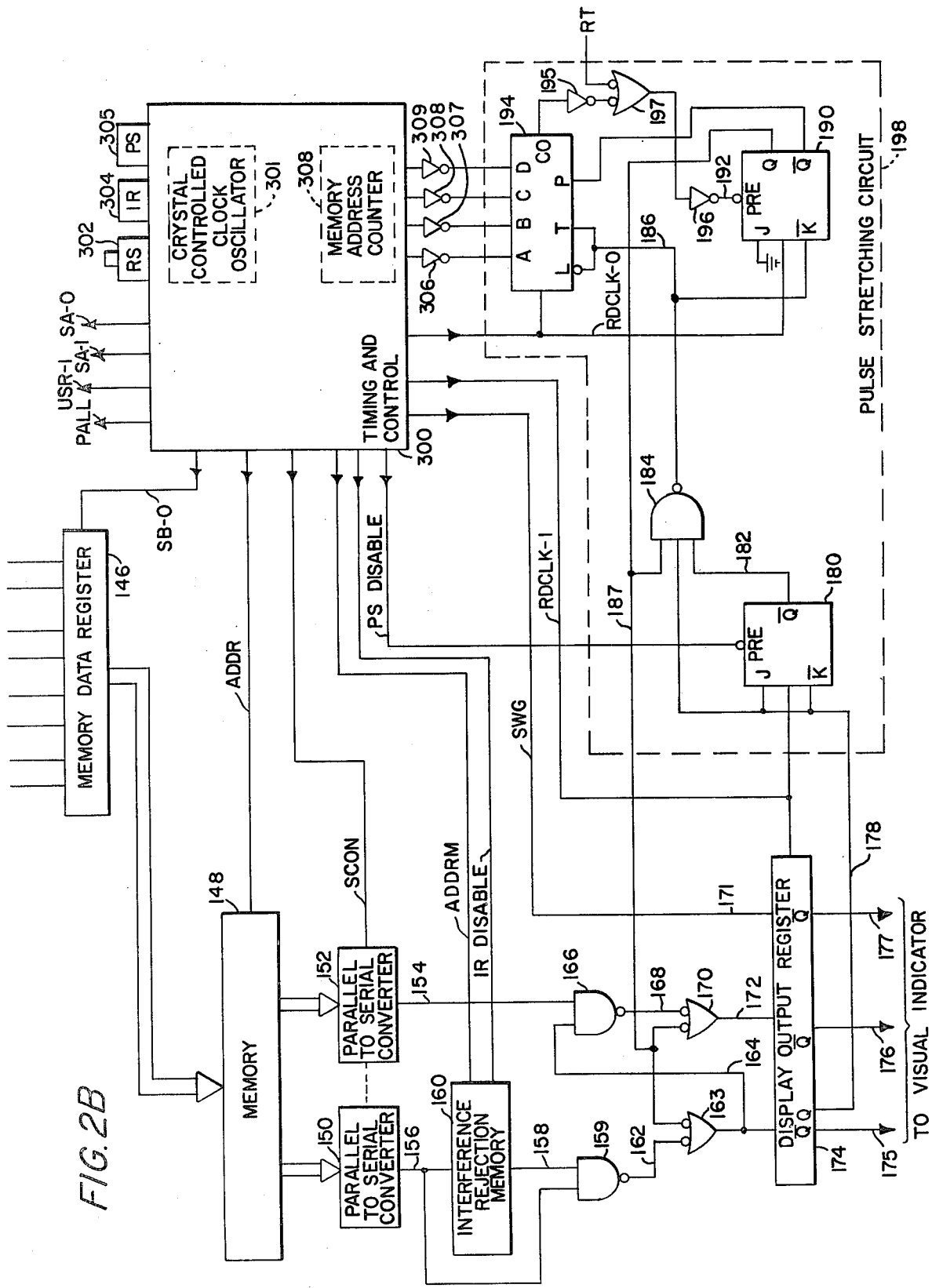

Next, referring to FIGS. 2A and 2B, a block/schematic diagram of the radar video digital processor embodying the invention is shown. The incoming radar return signals in analog form from the receiver are brought into the digital processing circuitry on line 122 and respectively coupled to the positive inputs of voltage comparators 124 and 126. The negative inputs of the voltage comparators are connected through the respective center terminals of potentiometers 128 and 130 to voltage +V which is always greater than the peak possible value of signals on line 122. The opposite ends of the potentiometers are connected to ground. With this arrangement, the inputs to the negative terminals of the voltage comparators can be individually adjusted between 0 and +V volts. Voltage comparators 124 and 126 operate to produce a low output voltage representing a logical 0 when the positive input is below that of the negative input and a high output voltage representing a logical 1 when the positive input exceeds the negative. Accordingly, when the signal on line 122 exceeds the voltage as presented to the negative input of a voltage comparator as adjusted by the respective potentiometer, the output of the voltage comparator is a 1 state. Conversely, when the signal on line 122 is less than the voltage presented to the negative terminal, the voltage comparator output is in a 0 state. This described threshold detection is an analog-to-digital conversion into two discrete levels. When the potentiometers are set properly, the outputs on lines 132 and 134 are a train of digital pulses, each pulse corresponding to a particular radar echo in the receiver video output. It is also noted that because each pulse is related to a particular echo receive time, each pulse has an associated range. It is preferable to set potentiometers 128 and 130 so that the voltage presented to the negative terminal of voltage comparator 124 is higher than the voltage presented to the negative terminal of voltage comparator 126. Accordingly, because the positive terminal inputs to the two comparitors are the same, the output on line 134 will be a HI LEVEL video and the output on line 132 will be a LO LEVEL video. In other words, some echoes on the receiver video signal may cross the threshold voltage on comparator 126 and be converted to a digital pulse while not crossing the threshold on comparator 124. In any event, a pulse on line 132 will probably be of longer time duration than the corresponding pulse on line 134. The purpose of having HI and LO LEVEL video signals will be discussed later herein.

The outputs from voltage comparators 124 and 126 are coupled respectively to 3-bit shift registers 202 and 200 which are clocked by the leading edge of the video sample rate (VSR-1) signal. The timing of VSR-1 will be discussed in detail later with reference to timing and control unit 300. The three stored sample bits of shift register 200 in addition to the incoming bit on line 132 are routed through AND gates 204b-g such that if any two of the four bits are logical 1's, a logical 1 is present at the input of NOR gate 201 causing a logical 0 active signal representation to appear on line 205. More specifically, line 132 is ANDed with the first most recent sample on line 240 in AND gate 204b; line 132 is ANDed with the second most recent sample on line 241 in AND gate 204c; line 132 is ANDed with the third most recent sample on line 242 in AND gate 204d; the first most recent sample on line 240 is ANDed with the second most recent sample on line 241 in AND gate 204e; and etc. One of the inputs for AND gate 204a is line 132; the other input is PALL (pass all) from timing and control unit 300. If PALL is a logical 1, all logical 1's on line 132 are passed through to NOR gate 201. The result is that a logical 1 on PALL disables the two out of four sample routine described above and passes the LO LEVEL (with logical 0 active signal representation) directly to line 205. In operation, when the range scale switch 302 is set at the three nautical mile range or less, PALL is a logical 1 so all LO LEVEL data on line 132 is present on line 205. When the range scale switch is on a range greater than the three nautical mile setting, two of the four most recent samples must be logical 1's for anactive signal representation to be presented to the next processing stage on line 205. For the HI LEVEL video, AND gates 206a-g and NOR gate 203 function identical to AND gates 204a-g and NOR gate 201 just described.

Shift registers 200 and 202, AND gates 204a-g and 206a-g, and NOR gates 201 and 203 comprise the preprocessor 250. As the leading edge of VSR-1 clocks a new time sample into shift registers 200 and 202, a new set (three of the samples being the same as the prior set) of four samples is evaluated. Accordingly, the preprocessor 250 has been referred to in the prior art as a sliding window processor. Its first function is to discriminate against noise; although noise may cross the voltage threshold described earlier herein, the statistical probability that it will cross for two out of four samples is greatly diminished. The second function of the preprocessor is that as a range cell time duration becomes longer for the longer range scale settings, and the transmitted pulse width is not proportionally increased, more than one sample may be required per range cell to increase the probability of target detection. It is understood that although a two out four sample preprocessor is described with reference to the preferred embodiment, it may be preferable to increase the number of samples instantaneously evaluated and make variable the number of positive samples required to meet the detection criteria.

The purpose of range cell sample and hold circuits 136 and 138, serial-to-parallel converters 142 and 143, memory data register 146, memory 148, and parallel-to-serial converters 150 and 152 is explained in detail in U.S. Pat. No. 4,107,673, assigned to the same assignee as the present invention, which is hereby incorporated by reference. More specifically, it is very desirable in marine radars to be able to change the range setting. For example, on the open sea, it may be desirable to display targets of ranges typically up to 48 nautical miles. However when greater accuracy is required, such as, for example, in docking operations and maneuvering through foggy harbors, it is desirable to have a much shorter range setting such as, for example, 0.25 nautical miles. Because the writing rate in a real time display system is inversely proportional to the radar range setting, the sweep speed for shorter range settings has been so fast that the display screen did not receive sufficient electron beam energy to produce enough light to overcome the background ambient. Accordingly, as described in the above referenced patent, it is desirable to write the digitized radar return signals into a storage device at a rate determined by the range setting and then read out the data at a constant rate that is independent of the range setting. This described non-real time technique provides improved display brightness in high ambient lighting conditions with simplified detection circuits and video amplifiers.

Again referring to FIG. 2A, the preprocessed HI and LO LEVEL signals on lines 207 and 205, respectively, are coupled through sample and hold circuits 138 and 136 to serial-to-parallel converters 143 and 142. Because the HI and LO LEVEL signals are processed identically in these two functional blocks, only the LO LEVEL circuit is described herein. The incoming preprocessed LO LEVEL video on line 205 is connected to an input of negative input AND gate 208. The other input is SA-1 clock, which is also connected to K of J-K flop 216. In operation, when SA-1 is in a logical 0 state, K of J-K flip flop is 0, and if line 205 is 0 indicating a detection from preprocessor 250, negative input AND gate 208 presents the J input with a logical 1. Accordingly, on the next VSR-0 (complement of VSR-1) clocking pulse, $\overline{Q}$ will be forced to a logical 0. Further, when SA-1 is in a logical 1 state, K of J-K flip flop 216 is in a 1 state and negative input AND gate 208 presents the J input with a logical 0. Accordingly, on the next VSR-0 clock pulse, $\overline{Q}$ is cleared to a logical 1. The timing of SA-1 will be described in detail later herein with reference to timing and control unit 300. However, it is important to note here that the time period when SA-1 is a logical 0 is equal to one range cell. Also, because the clock rate of VSR-1 is equal to or faster than SA-1, there may be more than one J-K flip flop 216 sample per range cell, any positive detection sample of which is held by J-K flip flop 216 causing the range cell to indicate detection. Further, in summary, each of the J-K flip flop 216 samples is associated with a sliding window position of preprocessor 250 where two positive out of four VSR-1 samples are required for detection (assuming PALL equal 0). The LO LEVEL preprocessed video on line 205 is also connected to an input of negative input OR gate 224. Accordingly, when only one sample per range cell is taken and there is no requirement to hold the sample from $\overline{Q}$ of J-K flip flop 216 to negative input OR gate 224, an alternate direct path from line 205 to serial-to-parallel converter 142 is provided. The output of negative input OR gate 224 is connected to 2-bit shift register 232 which is also clocked by SA-1. Shift register 232 functions as a serial-to-parallel converter wherein serial bits are clocked in from negative input OR gate 224 and parallel bits are available to memory data register 146. Still referring to FIG. 2A, it is shown that negative input AND gate 210, J-K flip flop 218, negative input OR gate 228, and shift register 236 are connected identically to the respective devices 208, 216, 224 and 232 just described. The difference in operation results from data input with SA-0 which is the inverse of SA-1. Accordingly, when data is being sampled and held in J-K flip flop 216, J-K flip flop 218 is being cleared, and when data is being sampled and held in J-K flip flop 218, J-K flip flop 216 is being cleared. Accordingly, sequential range cells are alternatively loaded into shift registers 232 and 236. It follows that in two SA pulse periods (two highs and two lows), four range cells will be loaded into the combination of shift registers 232 and 236. As mentioned previously, during the same time period, four HI LEVEL range cells are loaded into serial-to-parallel converter 143.

The parallel bits of serial-to-parallel converters 142 and 143 are connected to 8-bit memory data register 146 of FIG. 2B. The memory data register is clocked by SB-0, the timing of which will be described in detail with reference to timing and control unit 300. For purposes here, however, it is important to note that SB-0 is half the frequency SA-0. Accordingly, after four bits have been clocked into serial-to-parallel converter 142 simultaneous to four bits being clocked into serial-to-parallel converter 143, the combination of eight bits or range cells is strobed into 8-bit memory data register 146. The 8-bit word so formatted is therefore comprised of four least significant bits corresponding to four HI LEVEL range cells and four most significant bits corresponding to four LO LEVEL range cells.

The 8-bit words strobed into memory data register 146 are loaded into memory 148 with the sequential addresses provided by ADDR from timing and control unit 300. As each 8-bit word is written into memory, the memory address counter (MAC) 308 is incremented. The rate at which words are written into memory will be described in detail later herein with reference to timing and control unit 300. The maximum number of range cells or bits for a transmitted radar pulse period or sweep is 256. Accordingly, because there is HI and LO LEVEL video, memory 148 provides for storage of 512 bits in 64 8-bit word addresses. The memory may comprise a plurality of cascaded random access memories (RAM's) such as Texas Instrument 74S189 16×4 scratch pads or a more dense memory device, such as, for example, a Signetic 82S09 64×9. Also, shift registers may be used as storage devices. During the memory read cycle, the words are read out in the same order as they were written but at a rate independent of the range setting. The MAC is incremented for each address. For the shorter range settings, the read rate is much slower than the write rate, thus providing the enhanced display described in U.S. Pat. No. 4,107,673. For each word read out, the four bits representative of LO LEVEL video are clocked into parallel-to-serial converter 150 and the four bits representative of HI LEVEL video are clocked into parallel-to-serial converter 152. Typically, each of these converters comprises a 4-to-1 selector which when controlled by logic signal SCON sequences through the four bits available from memory 148 at a rate four times the rate at which words are read out of memory 148 by ADDR. Also, these converters could comprise 4-bit shift registers. The outputs of parallel-to-serial converters are continuous binary waveforms.

The purpose of preprocessor 250 as described herein earlier is to provide noise discrimination within one sweep period by requiring two positive samples out of the four samples of a sliding window. This is contrasted with the purpose of the interference rejection memory 160 which is to provide noise or interference discrimination by comparing each range cell within a sweep with its corresponding range cell from the previous sweep. Based on the relatively low probability that random noise will appear in the same range cell on two consecutive sweeps, the LO LEVEL output from parallel-to-serial converter 150 on line 156 is NANDed with its time delayed signal of 1 radar sweep period in NAND gate 159. Accordingly, to obtain a logical 0 signal on line 162 which is indicative of an echo return, the range cell on line 156 and the corresponding range cell from the previous transmitted pulse on line 158 must both be in a logical 1 state. The interference rejection memory 160 preferably comprises a 256×1 RAM such as a Fairchild 93410 or a shift register. For a RAM, ADDRM addresses the bit in interference rejection memory corresponding to the range cell being strobed out of parallel-to-serial converter 150. During the first phase of the ADDRM clock pulse, the bit content of the address is made available to NAND gate 159 for comparison with the present corresponding range cell. Then, during the second phase of the ADDRM clock pulse, the present corresponding range cell bit on line 156 is written into interference rejection memory, the address remaining the same for both phases. For a shift register configuration, ADDRM comprises a clock such that interference rejection memory provides a time delay of one sweep or one radar transmitted pulse period. IR DISABLE line from timing and control unit 300 provides logic control such that when the interference rejection switch 304 is in the OFF position, line 158 is maintained in a logical 1 state. The interference rejection in only provided for the LO LEVEL video, but, through negative input OR gate 163, it enables the HI LEVEL video on line 164.

The novel pulse stretching circuit 198 described hereinafter is initiated by a high signal on line 156 and a high signal from the LO LEVEL interference rejection memory on line 158, which together indicate an echo return. These two 1 states on NAND gates 159 causes a 0 on line 162 which results in a 1 on line 164 at the output of negative input OR gate 163. Line 164 is connected to display output register 174. Accordingly, the presence of a target on LO LEVEL video is presented to the visual indicator 118 on line 175 from $\bar{Q}$ being in a 0 state. The corresponding 1 state on line 178 from Q is leading edge detected by J-$\bar{K}$ flip flop 180. More specifically, with J and $\bar{K}$ tied together, J-$\bar{K}$ flip flop functions as a D flip flop. When no active signal is present, line 178 presents a 0 to NAND gate 184 and line 182 is in the 1 state. Then, when line 178 goes to a logical 1 indicating the presence of an echo return, line 182 stays high and line 186 goes to a logical 0. One J-$\bar{K}$ flip flop 180 clock pulse later, $\bar{Q}$ goes low causing the output of NAND gate 184 on line 186 to go back to a logical 1. The result as described is a conventional leading edge detector. The third input to NAND gate 184 is provided from pulse stretching line 187 so that the pulse stretching circuit will not be reinitiated while it is already active. Also, PS DISABLE from timing and control unit 300 is provided so that J-$\bar{K}$ flip flop 180 can be held in the preset state thus preventing leading edge detection and disabling pulse stretching.

Figure 3:
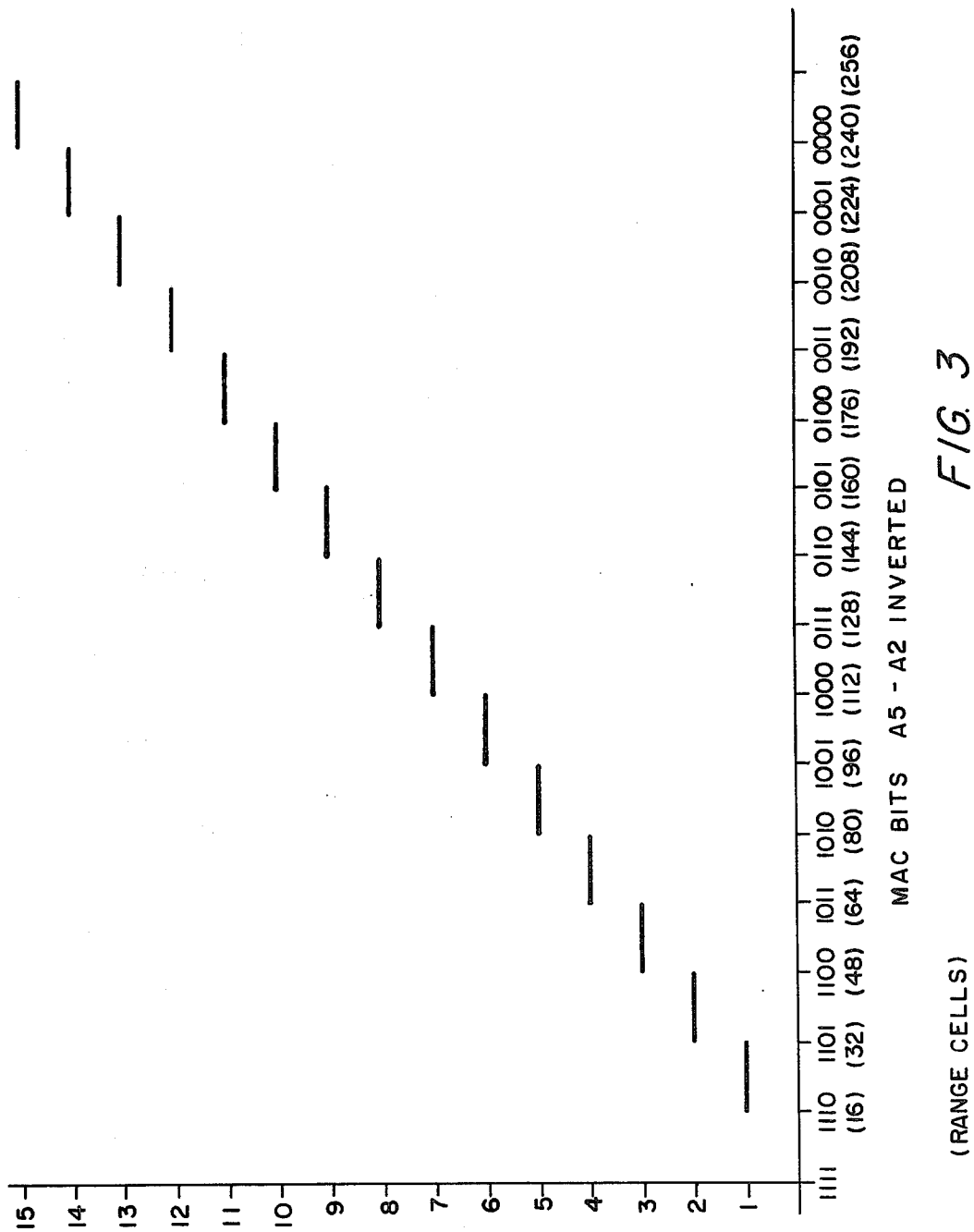
FIG. 3 is a graph showing the amount of pulse stretching as a function of memory address counter bits which are related to range.

When the leading edge of an echo return has been detected as indicated by a negative pulse on line 186, two simultaneous events happen. First, since J of J-$\bar{K}$ flip flop 190 is wired to a logical 0 and line 186 is connected to $\bar{K}$, the next clocking pulse causes Q to go to a 0 state. This 0 which is connected by line 187 to negative input OR gates 170 and 163 as shown, causes the continuation of an active signal to the visual indicator for both HI and LO LEVEL video even though the presence of an echo return is removed from respective lines 168 and 162. This described pulse stretching action is continued until J-$\bar{K}$ flip flop 190 is preset by line 192 from counter 194. The second action initiated by a negative pulse on line 186 is the loading of counter 194 with data representative of the range. That data comes from the memory address counter (MAC) 308 and is input on pins A-D of counter 194 as shown. The memory address comprises six bits (A0-A5) for the sixty-four locations in memory as previously described. On the load pulse, the inverse of the four most significant bits are loaded into the counter; the bits are inverted by inverters 306, 307, 308, and 309. Accordingly, because the address of the data is proportional to the range, and the inverse of the address is loaded, the greater the range is, the smaller the value that is loaded into the counter. Therefore, the greater the range, the longer is takes to count to the carry out. Referring to FIG. 3, a graph is shown which depicts the amount of pulse stretching versus range. The abscissa is the memory address counter bits A5-A2 inverted. Given in parenthesis are the corresponding range cells. The ordinate is the number of range cells or read clock (RDCLK) pulses before a carry out occurs. For example, between range cells 128 and 143, the memory address counter bits A5-A2 are 1000 which when inverted give 0111 as shown on the abscissa. If J-$\bar{K}$ flip flop 180 detects a leading edge during range cells 128-143, a 0111 is loaded into counter 194. As shown on the ordinate, eight RDCLK pulses later, counter 194 counts up to 1111 and a carry out is generated. The carry out passes through two inverter amplifiers 195 and 196 and negative input OR gate 197 to preset J-$\bar{K}$ flip flop 190. The preset overrides the pulse stretching by forcing Q to a 1 state. The radar trigger (RT) pulse into negative input OR gate 197 guarantees no pulse stretching at the beginning of the radar sweep period. T and P terminals on counter 194 are count and carry out enables. In operation, then, pulse stretching circuit 198 detects the leading edge of a pulse representative of detection on LO LEVEL video and proportionately stretches that pulse and the corresponding HI LEVEL pulse as a direct function of range. It is important to note that the pulse stretching circuit is initiated from the leading edge of the pulse so that if the duration of the pulse on line 168 exceeds the indicated amount of stretching, the duration of the displayed signal pulse on line 176 or line 175 will not be altered. Typically, HI and LO LEVEL video are summed in visual indicator 118 and coupled to the video amplifier (not shown) which is connected to the cathode (not shown) of the cathode ray tube (not shown) for modulating the beam intensity thereof. The HI and LO LEVEL video provide target definition on a PPI display by painting with two intensity levels (LO and LO+HI) in addition to the ambient level when there is no detection. SWG pulse coupled from timing and control unit 300 through display output register 174 to visual indicator 118 triggers the generation of a deflection waveform at the beginning of a sweep period.

Figure 5:
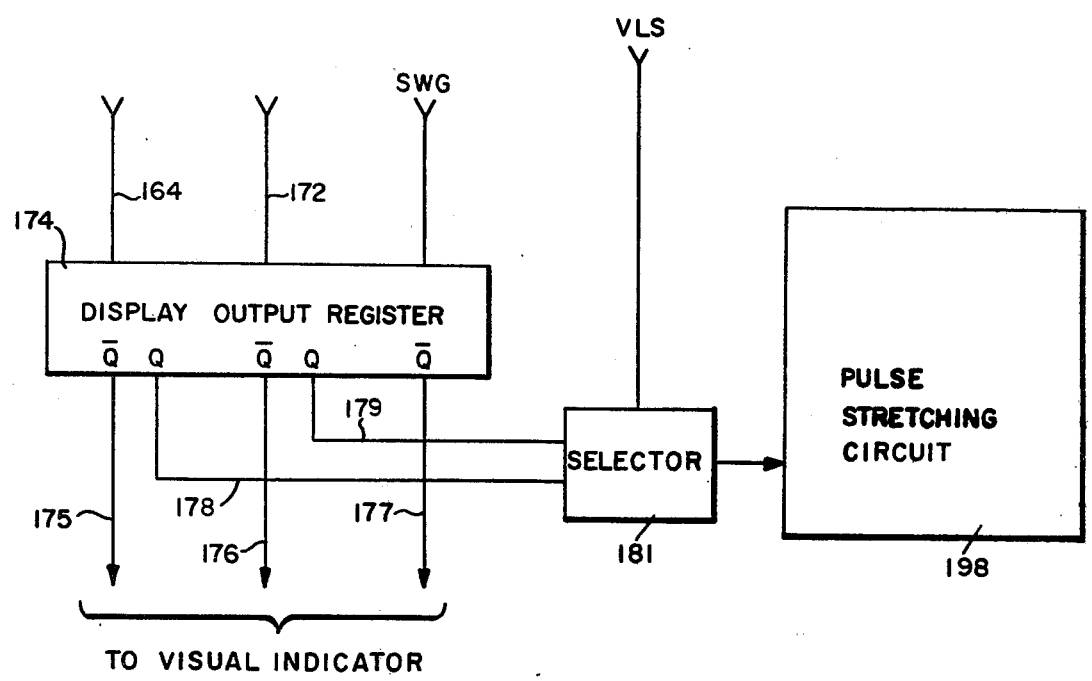
FIG. 5 is a schematic diagram of an alternate embodiment of the coupling between the display output register and pulse stretching circuit as shown in FIG. 2B.

Referring to FIG. 5, an alternate embodiment of the coupling between display output register 174 and pulse stretching circuit 198 of FIG. 2B is shown. As previously described with reference to FIG. 2B, the LO and HI LEVEL video signals are input to display output register 174 on lines 164 and 172, respectively, and the Q outputs are coupled to the visual indicator. In FIG. 5, the respective Q outputs are connected to selector 181, the function of which is to make selectable the video LEVEL which initiates pulse stretching. Control signal VLS (video LEVEL select) from timing and control unit 300 determines whether HI LEVEL video on line 179 or LO LEVEL video on line 178 is coupled to the pulse stretching circuit 198. It may be preferable to use LO LEVEL video to initiate pulse stretching during normal operation; the targets at long range which require stretching for acceptable visual detection may not cross the high threshold. In the alternative, it may be preferable to initiate the pulse stretching circuit by detection of HI LEVEL video in which case signals which are detected on LO LEVEL but not on HI LEVEL will not be stretched. This configuration enables the receiver gain to be turned up to a level where some receiver noise can be seen on the visual indicator without distorting the display presentation by stretching that noise. VLS may be determined by the range scale setting switch 302 such as, for example, HI LEVEL initiation for the 12 nautical range scale setting and shorter with LO LEVEL detection for the longer ranges. Also, VLS could be determined by a switch (not shown) on timing and control unit 300.

As stated previously herein, it is preferable in a marine radar to provide a plurality of range scale settings. In the preferred embodiment, nine such settings may be selected using the range scale switch 302 which is coupled to timing and control unit 300 as shown in FIG. 2B. The incremental range scale settings are listed in Table I.

TABLE I

| Range Setting | Approximate Round-trip return time | Timing coefficients N | M | K | Number of range cells |
|---|---|---|---|---|---|
| 0.25 nm | 3.08 usec | 1 | 2 | 48 | 85 |
| 0.5 | 6.17 | 1 | 2 | 24 | 170 |
| 0.75 | 9.26 | 1 | 2 | 16 | 256 |
| 1.5 | 18.52 | 1 | 4 | 16 | 256 |
| 3 | 37.04 | 1 | 8 | 16 | 256 |
| 6 | 74.07 | 8 | 2 | 32 | 256 |
| 12 | 148.15 | 8 | 4 | 32 | 256 |
| 24 | 296.30 | 8 | 8 | 32 | 256 |
| 48 | 592.59 | 8 | 16 | 32 | 256 |

Range scale switch 302 addresses a control PROM (not shown) which is part of timing and control unit 300. The PROM's outputs are static control lines which determine many of the operational parameters of the radar system. It is understood that the description which follows is with reference to the preferred embodiment and that for various applications, the PROM could be programmed differently, thus providing different operational parameters. First, as discussed earlier herein, PALL line is a logical 1 for the 3-nautical-mile range setting and below, thus disabling the preprocessor 250 function of providing echo return data to sample and hold circuits 136 and 138 only when detected in two out of four samples. Second, the pulse stretching circuit 198 is disabled by PS DISABLE for the 6-nautical-mile range setting and below by providing a preset to J-$\overline{\text{K}}$ flip flop 180 thus preventing the detection of a leading edge which would otherwise initiate pulse stretching. Third, the proportional pulse stretching can be manually disabled by the same PS DISABLE control signal by placing the pulse stretching switch 305 in the OFF position. And last, as to control functions, the interference rejection memory 160 can be disabled by the IR DISABLE control signal by placing the interference rejection switch 304 to the OFF position.

Still referring to FIGS. 2A and 2B, the timing functions of timing and control unit 300 are discussed with further reference to FIGS. 4A–4H and Table I herein. As stated earlier herein, the processing from the input of the radar video digital processor 116 on line 122 to storing in memory 148 is performed in real time. Therefore, within a radar transmitted pulse period, the time duration of the write cycle as depicted by the write enable waveforms of FIGS. 4E and 4G is determined by the round trip echo return time for the longest range of a particular range scale setting. More specifically, since the round trip echo return time for the 12-nautical-mile range is 148.15 microseconds, echo representations are written into memory 148 for this time period when in the 12-nautical-mile range scale setting. Similarly, since the round trip echo return time for the 24-nautical-mile range is 296.3 microseconds, echo representations are written into memory 148 for this time period when in the 24-nautical-mile range scale setting. In general, then, the time duration of the write cycle for each range setting is listed in Table I as the approximate round trip return time. During the write cycle, which could also be referred to as the sample cycle, timing and control unit 300 provides VSR-1 to shift registers 200 and 202, SA-1 and SA-0 to sample and hold circuits 136 and 138 and serial-to-parallel converters 142 and 143, SB-0 to memory data register 146, and ADDR to memory 148 as shown in FIG. 3. The write cycle commences at the radar trigger pulse as shown in FIG. 4A. In the preferred embodiment, the transmitter pulse rate frequency (PRF) is 1000 Hz for the 6-nautical-mile range scale setting and above; settings less than 6 nautical miles have a PRF of 2000 Hz.

All timing is derived from a single crystal controlled clock oscillator (CLOCK) 301, the frequency of which is determined by the number of range cells to be stored on the 0.75-nautical-mile range scale setting. More specifically, with a round trip return time of approximately 9.26 microseconds as shown in Table I and a resolution into 256 stored range cells per video LEVEL, a clock frequency, which in this case is also the VSR-1 frequency, of 27.6481 megahertz is used. It is noted that with 27.6481 megahertz as the maximum VSR-1 rate and respective real time echo returns of 3.08 and 6.17 microseconds for the 0.25-and 0.5-nautical-mile ranges, only 85 and 170 samples or range cells are provided for these respective settings. It is further noted that a faster clock could have provided full use of 256 storage range cells for these two settings. However, a faster clock would have complicated the design of the video digital signal processor and added undue cost. Therefore, for the 0.75-nautical-mile range setting and above, 256 HI LEVEL and 256 LO LEVEL range cells are stored in memory 148, completely filling up the sixty-four 8-bit addresses. With the 0.25-and 0.5-nautical-mile range settings, however, only twenty-two and forty-three of the 8-bit locations are respectively used.

VSR-1 for all range scale settings is determined by dividing CLOCK by N where N is given in Table I. For example, with the 48 nautical mile range scale setting, VSR-1 is approximately 3.456 (27.6481÷8) megahertz such that in the sample cycle of 592.59 microseconds, 2048 samples are taken or 8 samples per each of the 256 range cells. Further, with the 12-nautical-mile range scale setting, VSR-1 is approximately 3.456 megahertz such that in the sample cycle of 148.15 microseconds, 512 samples are taken or two samples per each of the 256 range cells.

In the preferred embodiment, the rate of SA-1 and its complement SA-0 is determined by dividing the VSR-1 rate by M, where M is given in Table I for each range scale setting. More specifically, using the examples of the previous paragraph, SA-1 for the 48- and 12-nautical-mile range scale settings is 216 and 432 kilohertz, respectively. As discussed earlier herein, the time period of one range cell is equal to the low or high time of the SA-1 or SA-0 pulse. Accordingly, because the LO LEVEL samples are taken by J-K flip flops 216 and 218 on opposite phases of SA, four LO LEVEL samples are taken in sample and hold circuit 136 in two SA clock periods. During the same two SA clock periods, four HI LEVEL samples are taken in sample-and-hold circuit 138. The SB-0 rate which clocks 4-bits of LO LEVEL and 4-bits of HI LEVEL video into memory data register 146 is therefore determined by dividing the SA clock rate by 2. It follows that for the examples of 48- and 12-nautical-mile range scales settings of above, SB-0 is 108 kilohertz and 216 kilohertz, respectively. During the write cycle, the addresses provided to memory 148 gy ADDR are at the same rate as SB-0.

For the 0.75-nautical-mile range scale setting and above, the time duration of the read cycle as depicted by the read enable waveforms of FIGS. 4F and 4H is determined by the time taken to process 256 range cells at a rate equal to CLOCK divided by K, where K is given in Table I. More specifically, for range scale settings 0.75 to 3 nautical miles, RDCLK-0 and RDCLK-1 rates are approximately 1.728 (27.6481÷16) megahertz and for range scale settings 6 to 48 nautical miles, the rates are approximately 864 (27.6481÷32) kilohertz. Because the sweep rate (2000 Hz) for the 3-nautical-mile range scale setting and below is twice the rate (1000 Hz) of the longer settings, the RDCLK rate for the longer settings is half the rate of the 0.75-to-3-nautical-mile group in order to paint on the visual display with the same intensity. The RDCLK rate for the 0.25- and 0.5-nautical-mile range scale settings is proportionally reduced because there are only 85 and 170 respective range cells to be displayed. For the respective range scale groups of 0.75 to 3 nautical miles and 6 to 48 nautical miles and with 256 range cells to be processed at the respective RDCLK rates, the time durations of the read cycles are approximately 148.15 and 296.3 microseconds. It follows that the rate at which range cells are clocked out of parallel-to-serial converters 150 and 152 by SCON must be the same as the RDCLK rate. It further follows that the rate at which range cells are read out of interference rejection memory 160 must also equal the RDCLK rate for the corresponding range cells from sweep to sweep to be compared. Finally, because each word read out of memory 148 comprises 4-bits of HI LEVEL and 4-bits of LO LEVEL video, the address provided to memory 148 by ADDR during the read cycle must be at a rate of RDCLK divided by four.

The read cycle is initiated at the completion of the write cycle as can be seen by viewing FIG. 4F with reference to FIG. 4E and viewing FIG. 4H with reference to FIG. 4G. It is important to note that HI and LO LEVEL video data is transferred to the visual indicator 118 on respective lines 176 and 175 only during the read cycle. Further, the sweep of the visual indicator such as, for example, a PPI display mode device, is initiated by SWG on line 177 at the beginning of the read cycle. The time duration from the completion of the read cycle to the next radar trigger pulse can be described as a wait cycle when no receiver video is processed in radar video digital processor 116 and no video output is transferred to visual indicator 118.

In FIG. 4B is shown an example of the receiver video input to radar video digital processor 116 as it would appear on line 122. Peaks 320–327 represent return echoes from various targets within the area scanned by the radar antenna. The voltages presented to the negative terminals of voltage comparators 124 and 126 of FIG. 2 are depicted by respective high and low thresholds of FIG. 4B. FIGS. 4C and 4D are respectively illustrative of the waveforms appearing on lines 132 and 134 of FIG. 2A for the thresholds shown in FIG. 4B. Note that generally the pulses of FIG. 4C are of longer time duration than the corresponding pulses of FIG. 4D because the receiver video of FIG. 4B crosses the low threshold for the longer period of time. Also note that peak 324 crosses the low threshold and appears in FIG. 4C but does not appear in FIG. 4D. In operation with pulse stretching circuit 198 not disabled, all peaks or pulses would initiate pulse stretching; in the alternate embodiment with VLS determining HI LEVEL initiation of the pulse stretching circuit, peak 324 would not initiate pulse stretching. Although not drawn to scale, the time duration of peaks 320–323 would not be increased by the pulse stretching circuit 198 for two reasons. First, peaks 320–323 are of relatively long time duration as would be expected for the relatively strong echoes received from the shorter range targets. Second, the amount of pulse stretching from the leading edges would be for a relatively small number of range cells because of the short range of the targets (see FIG. 3). Accordingly, the pulse stretching signal on line 187 of FIG. 2B would disappear before the HI and LO LEVEL target representations on lines 168 and 162. The shorter pulses, especially those on HI LEVEL video, corresponding to peaks 325–327 would be increased in time duration by pulse stretching circuit 198. Again referring to FIG. 3, the amount of stretching is a function of the range of the target.

Although specific embodiments of the invention have been described, numerous modifications and alterations thereto would be apparent to those skilled in the art without departing from the spirit and scope of the present invention. Therefore, it is intended that the scope of the invention be limited only by the following claims.

What is claimed is:

1. In combination:
   means for converting a radar echo signal into a voltage waveform having a plurality of discrete voltage levels;
   means for increasing the time duration of one level of said discrete voltage levels as a direct function of range; and
   means for providing a visual indication of the output of said increasing means.

2. The combination in accordance with claim 1 wherein said increasing means comprises means for maintaining said one level at the output of said increasing means for a time duration determined by counter means.

3. The combination in accordance with claim 2 wherein said counter means is loaded with a digital value at the commencement of said one level, said digital value being related to the range corresponding to the commencement of said one level.

4. The combination in accordance with claim 3 wherein said visual indication means is a PPI display.

5. In combination:
means for converting a radar echo signal into a voltage waveform having a plurality of discrete voltage levels;
means coupled to said converting means for eliminating interference in said voltage waveform;
means coupled to said eliminating means for increasing the time duration of one of said discrete voltage levels as a direct function of range; and
means for providing a visual indication of the output of said increasing means.

6. The combination in accordance with claim 5 wherein said increasing means comprises means for maintaining said one level at the output of said increasing means for a time duration determined by counter means.

7. In combination in accordance with claim 6 wherein said counter means is loaded with a digital value at the commencement of said one level, said digital value being related to the range corresponding to the commencement of said one level.

8. The combination in accordance with claim 7 wherein said visual indication means is a PPI display.

9. The combination in accordance with claim 8 wherein said eliminating means comprises:
means coupled to said converting means for producing digital representations of said waveform;
means coupled to said producing means for storing said digital representations;
means coupled to said storing means for comparing the outputs of said producing means and storing means, said comparing means eliminating interference from said digital representations.

10. In combination:
first means for storing digital representations of a radar return signal;
means for reading said representations out of said storing means, the time period for reading said representations out of said storing means being greater than the time period for reading said representations into said storing means for at least some settings of a radar range scale setting;
means for producing a video signal in response to representations read out from said storing means, said video signal having discrete voltage levels;
means coupled to said producing means for eliminating interference in said video signal;
means coupled to said eliminating interference means for increasing the time duration of at least one level of said discrete levels as a direct function of range; and
means coupled to said increasing means for providing a visual indicator of the output of said increasing means.

11. The combination in accordance with claim 10 wherein said inteference eliminating means comprises:
second means for storing digital representations of a radar return signal, inputs of said second storing means being coupled to the output of said producing means;
means for comparing the outputs of said producing means and said second storing means; and
means for eliminating interference from said video signal in response to said comparing means.

12. The combination in accordance with claim 11 wherein said interference eliminating means comprises means for shutting off said video signal in response to said comparing means.

13. The combination in accordance with claim 10 wherein said producing means comprises a parallel to serial converter.

14. The combination in accordance with claim 12 wherein said increasing means comprises means for maintaining said one level at the output of said increasing means for a time duration determined by counter means.

15. The combination in accordance with claim 14 wherein said visual indication means is a PPI display.

16. In combintion:
means for converting a radar echo signal into a voltage waveform having a plurality of discrete voltage levels;
means for producing digital representations of said waveform;
means coupled to said producing means for storing said representations;
means for reading said representations out of said storing means, the time period for reading said representations out of said storing means being greater than the time period for reading said representations into said storing means for at least some settings of a radar range scale setting;
means for providing a video signal in response to representations read out from said storing means, said video signal having discrete voltage levels;
means for increasing the time duration of at least one level of said discrete voltage levels as a direct function of range; and
means for visually displaying the output of said increasing means.

17. The combination in accordance with claim 16 wherein increasing means comprises means for maintaining said one level at the output of said increasing means for a time duration determined by counter means.

18. The combination in accordance with claim 17 wherein said displaying means is a PPI display.

19. A marine radar system for enhancing the visual detection of long range targets without distorting the presentation of short range targets on the same range scale setting, said system comprising in combination:
means for transmitting a radar pulse;
means for receiving radar signals;
means for converting received radar signals corresponding to a plurality of radar ranges to digital representations thereof, said converting means coupled to said receiving means;
means for storing said digital representations in a first time period;
means for reading out said representations in a second time period, said second time period being greater than said first time period for the shorter ranges of the radar range setting and said second time period being constant for at least some ranges of said radar range setting;

means for producing a video signal in response to said representations read out from said storing means, said video signal having discrete voltage levels;
means coupled to said producing means for eliminating interference in said video signal;
means coupled to said interference eliminating means for increasing the time duration of at least one of said voltage levels of said video signal as a direct function of range; and
means for visually displaying the output of said increasing means.

20. The combination in accordance with claim 19 wherein said increasing means comprises means for maintaining said one level at the output of said increasing means for a time duration determined by counter means.

21. The combination in accordance with claim 20 wherein said displaying means is a PPI display.

22. In combination:
means for converting a radar echo waveform into signals representing at least two different amplitude levels of said echo waveform;
means coupled to said converting means for eliminating interference in said signals;
means coupled to said eliminating means for increasing the time duration of said signals as a direct function of the range of said echo waveform, said increasing means being initiated by said signals representing the lower amplitude level of said echo waveform; and
means for providing a visual indication of the output of said increasing means.

23. A processing system for a radar comprising:
means for accepting signals derived from radar echo returns;
means for increasing the time duration of said signals as a direct function of range; and
means for supplying an output from said increasing means to a signal channel for coupling to a radar display.

24. A processing system for a radar comprising:
means for accepting signals derived from radar echo returns;
means coupled to said accepting means for eliminating interference in said signals;
means coupled to said interference eliminating means for increasing the time duration of said signals as a direct function of range; and
means for supplying an output from said increasing means to a signal channel for coupling to a radar display.

* * * * *